United States Patent [19]

Porte

[11] Patent Number: 4,618,666

[45] Date of Patent: Oct. 21, 1986

[54] DISILANE/ORGANOSILICON RESIN HAVING ENHANCED THERMOMECHANICAL PROPERTIES

[75] Inventor: Hugues Porte, Lyons, France

[73] Assignee: Rhone-Poulenc Specialites Chimiques, Courbevoie, France

[21] Appl. No.: 735,994

[22] Filed: May 20, 1985

[30] Foreign Application Priority Data

May 18, 1984 [FR] France .................. 84 07725

[51] Int. Cl.⁴ ............................................. C08G 77/04
[52] U.S. Cl. ...................................... 528/33; 528/10; 528/34; 556/430
[58] Field of Search .................... 528/33, 34, 10; 556/430

[56] References Cited

U.S. PATENT DOCUMENTS 4,266,068 5/1981 Allain ................... 556/430

Primary Examiner—Melvyn I. Marquis
Attorney, Agent, or Firm—Burns, Doane, Swecker & Mathis

[57] ABSTRACT

Novel high performance disilane/organosilicon resins useful, e.g., as molding powders and textile and building waterproofing agents (either in the form of aqueous dispersions or organic solutions thereof), comprise cohydrolysis/condensation reaction products in heterogeneous solvent medium of admixture of organochlorosilanes and organochlorodisilanes, said admixture comprising:

(i) from about 10 to 70 molar % of at least one diorganochlorosilane having the formula $R_2SiCl_2$, in which the radicals R, which may be identical or different, are each hydrogen, methyl or phenyl;

(ii) from about 30 to 70 molar % of at least one methylchlorodisilane which comprises at least about 30 moles % of tetrachloro-1,2-dimethyldisilane; and (iii) from 0 to about 60 molar % of at least one organotrichlorosilane having the formula $R'SiCl_3$, in which R' is defined as is R above;

and said resins having an average functionality of from about 2.2 to 3.

22 Claims, No Drawings

DISILANE/ORGANOSILICON RESIN HAVING ENHANCED THERMOMECHANICAL PROPERTIES

BACKGROUND OF THE INVENTION

1. Field of the Invention

The present invention relates to an organosilicon resin comprising recurring disilane units and having improved thermomechanical and waterproofing properties, a process for the preparation of such resin and the use thereof, in particular, as electrical insulation, molding powder, waterproofing agent, notably for textiles, and, more especially, as waterproofing agent for buildings, notably those constructed of masonry and concrete.

2. Description of the Prior Art

Organosilicon resins, including those comprising recurring disilane units, are known to this art, the process for preparation thereof being described, in particular, in the last paragraph on page 193 of Walter Noll, *Chemistry and Technology of Silicones,* Academic Press, 2nd edition (in English) (1968), and in U.S. Pat. Nos. 2,661,348 and 2,449,572.

According to such process, simultaneous hydrolysis and condensation of methylchlorosilanes and/or phenylchlorosilanes and/or methylphenylchlorosilanes are carried out in heterogeneous phase in the presence of an organic solvent immiscible, or very slightly miscible, with water which is present in excess, this solvent being a solvent for the starting material silanes and for the hydrolyzed and condensed silanes. The hydrolysis and condensation reaction is highly exothermic, and the reaction mixture is hence cooled. As solvent, there is generally used diethyl ether, dibutyl ether, white spirit, xylene, toluene and trichloroethylene.

The acidic water is decanted, the hydrochloric acid then optionally removed, for example, by washing the organic layer containing the resin until it is neutral, the organic layer is dried and the solvent then optionally removed.

There is thus obtained a partially hydrolyzed precondensed resin containing silanol groups, and this can be used as is and then cross-linked hot at a temperature of approximately 200° to 250° C. for applications such as molding powder, electrical insulator, and the like.

In the case where it is more especially required to use the resin as a waterproofing agent for masonry, it is also possible to isolate the resin from the reaction mixture in the form of a solution, which is generally diluted to 5 to 15% by weight and which can range up to 70% by weight of resin.

To improve the thermomechanical properties of these resins, it is known to add to the starting material alkylchlorosilanes phenylchlorosilanes, such as phenyltrichlorosilane or diphenyldichlorosilane, or phenylalkylchlorosilanes such as phenylmethyldichlorosilane. These silanes possess the major disadvantage of being much more expensive than the methylchlorosilanes which originate from the so-called direct synthetic process of Rochow, described in particular in U.S. Pat. Nos. 2,380,995 and 2,488,487, and which consists of reacting methyl chloride with a contact mass composed of silicon and copper at a temperature ranging from 200° to 500° C.

During this process, polysilanes are formed, and in particular chloromethyldisilanes, which are difficult to exploit commercially and technically.

It too has been proposed, in French Pat. No. 1,446,520, to hydrolyze its by-products in the absence of organic solvent and to incorporate them in building materials.

In French Pat. No. 1,081,726, there is described the preparation of organosilicon resins by hydrolysis and condensation of the entire crude residue of the direct synthesis boiling at 120°–170° C., or from the individual fractions boiling within certain temperature ranges. On page 1, right-hand column, last paragraph, and in Examples 2 and 4 of that patent, there is introduced the addition of, among other materials, dimethyldichlorosilane, respectively, to a polysiloxane residue boiling at 152°–154° C., and a crude residue boiling at 120°–170° C.

The resins obtained according to the teachings of the above-mentioned patent exhibit difficulties when they are used for waterproofing, and above all, cannot be obtained without entailing the appearance of microgels during the cohydrolysis. These microgels, which are insoluble in the organic solvents used, block the filters which are used to filter the decanted resin solutions, and this constitutes a major disadvantage in the industrial production of such resins. Furthermore, the presence of these microgels is an obvious cause of losses in starting materials, interferes with the decantation and prolongs the time required for the latter.

SUMMARY OF THE INVENTION

Accordingly, a major object of the present invention is the provision of a novel class of organosilicon resins comprising recurring disilane functions, which improved resins are conspicuously devoid of those disadvantages and drawbacks to date characterizing the state of this art.

Another object of this invention is the provision of improved organosilicon resins comprising recurring disilane units, which resins, while possessing good waterproofing properties, additionally possess superior thermomechanical properties.

Still another object of the present invention is the provision of organosilicon resins comprising recurring disilane units and further comprising appropriate amount of silanols.

Yet another object of this invention is the provision of organosilicon resins prepared from a mixture of organochlorosilanes, the organotrichlorosilane which provides the T unit in the resin being completely or partially replaceable by methylchlorodisilanes.

Another object of this invention is the provision of organosilicon resins which do not entail, during the preparation thereof, the appearance of microgels which are insoluble in the organic solvents used in the hydrolysis, are rich in self-cross-linked T units and block the filters used for filtering the dissolved resins.

Briefly, the present invention features improved organosilicon resins comprising recurring disilane units, which resins are prepared by a process which includes cohydrolysis and condensation, in a heterogeneous solvent medium, of a mixture of organochlorosilanes and organochlorodisilanes, said mixture comprising:

(i) 10 to 70 molar % of at least one diorganodichlorosilane having the formula $R_2SiCl_2$, wherein the radicals R, which may be identical or different, represent a hydrogen atom or a methyl or phenyl radical; R preferably denotes a methyl radical, (ii) 30 to 70 molar % of at least one methylchlorodisilane containing at least 30 molar % of tetrachloro-1,2-dimethyldisilane ($Cl_2CH_3Si)_2$, and the molar complement to 100% is optionally accomplished by formulating therewith:

(iii) up to 60 molar % of at least one organotrichlorosilane having the formula R'SiCl₃, in which the radical R' is defined as was R in the above component (i); the radical R' preferably denotes a methyl or phenyl radical; and said product resin further having an average functionality f̄, as defined below, ranging from approximately 2.2 to 3, inclusive, preferably from approximately 2.6 to 2.9, inclusive.

DETAILED DESCRIPTION OF THE INVENTION

More particularly according to the present invention, when R and R' are methyl radicals, the product resin is a so-called "methyl resin" which has all of the desired properties provided hereby. In the case where R and/or R' are at least partially replaced by phenyl radicals, the product resin is a so-called "methyl/phenyl resin" which is admittedly higher in cost but which possesses better thermomechanical properties.

It is possible to prepare resins according to the invention solely from the starting material constituents (i) and (ii), where the constituent (ii) comprises essentially only tetrachloro-1,2-dimethyldisilane (CH₃Cl₂Si)₂.

However, it is advantageous to not isolate such material and to directly use a mixture of disilanes containing at least 80 molar % of a mixture of tetrachloro-1,2-dimethyldisilane ($Cl_2CH_3Si)_2$ and trimethyl-1,1,2-trichlorodisilane (CH₃)₂ClSi-SiCl₂CH₃, this mixture being present in the distillation residue fraction of the direct synthesis, and distilling at from 151° to 155° C., preferably from 152° to 154° C., the latter fraction also containing from 1 to 15 molar % of tetramethyl-1,2-dichlorodisilane [(CH₃)₂ClSi]₂.

The preferred fraction is that which distils from 152° to 154° C. and contains approximately 52-57 molar % of tetrachloro-1,2-dimethyldisilane, 40 to 41 molar % of trimethyl-1,1,2-trichlorodisilane and 2.5 to 6 molar % of tetramethyl-1,2-dichlorodisilane and tetramethyl-1,1-dichlorodisilane.

The subject organosilicon resins principally comprise methylated difunctional units:

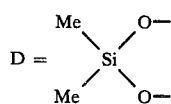

methylated trifunctional units:

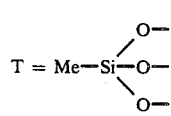

and/or phenylated trifunctional units:

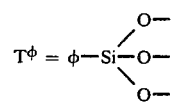

It is known that organosilicon resins lose a large extent of their mechanical properties at high temperatures (200°-300° C.). To overcome this defect, it is also known to employ very substantial proportions of trifunctional T units (40 to 95%). Since the capacity of siloxane chains for forming ring structures (and especially rings containing 4 —Si—O bonds) is great, this results in a self-condensation of the trifunctional molecules with each other, causing the formation of a network of polycyclic "ladder" structures:

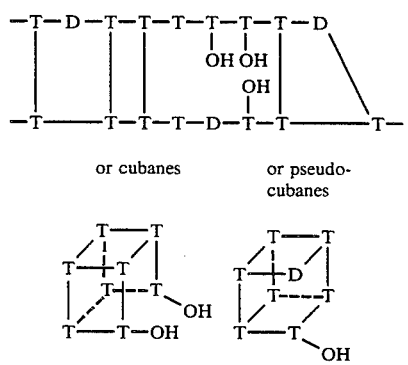

These microstructures impair the quality of the final product, since the effective degree of cross-linking is distinctly less than the potential degree of cross-linking of the network. Furthermore, they give rise to heterogeneity in the system in the form of microgels.

The present invention enables such disadvantage to be specifically overcome by replacing all or a portion of the T units by disilane units as multifunctional nodes.

It is customary in this art to characterize silicone resins by the ratio R/Si (number of carbon substituents per Si atom). This value can easily be related to the average functionality of the product, since in this case:

$$f = 4 - R/Si.$$

The use of disilanes modifies this calculation. In effect, the NMR spectra of ²⁹Si evidences that the ≡Si—Si≡ bond is quantitatively preserved during hydrolysis. The disilane unit hence behaves as a tri- or tetrafunctional compound while preserving carbon substituents on the silicon atoms. Trifunctional

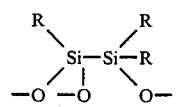

or tetrafunctional

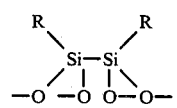

For this reason, for an equal average functionality of the monomers (which factor partially determines the rigidity of the network), the R/Si ratio is higher for products containing disilane units. In cases 1 to 3 below, a calculation of R and the functionality $\bar{f}$ are given:

Case 1 (without desilane):

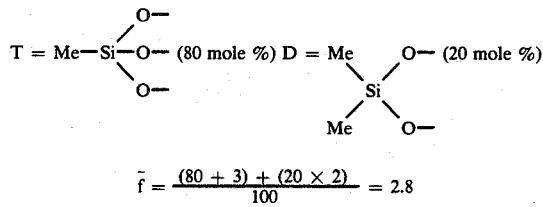

$$\bar{f} = \frac{(80 + 3) + (20 \times 2)}{100} = 2.8$$

$$R/Si = \frac{(80 \times 1) + (20 \times 2)}{100} = 1.20 = 4 - \bar{f}$$

Case 2 (with tetrachloro-1, 2-dimethyldisilane and dimethyldichlorosilane):

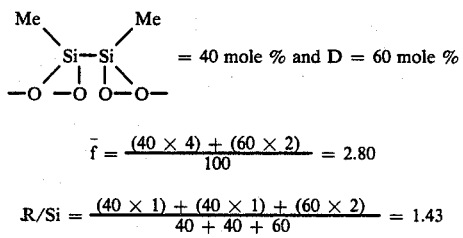

$$\bar{f} = \frac{(40 \times 4) + (60 \times 2)}{100} = 2.80$$

$$R/Si = \frac{(40 \times 1) + (40 \times 1) + (60 \times 2)}{40 + 40 + 60} = 1.43$$

R/Si differs from $4 - \bar{f}$.

Case 3 (with tetrachloro-1,2-dimethyldisilane and trichloro-1,1,2-trimethyldisilane and dimethyldichlorosilane):

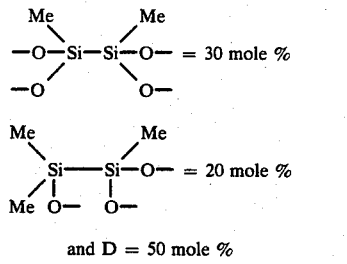

and D = 50 mole %

$$\bar{f} = \frac{(30 \times 4) + (20 \times 3) + (50 \times 2)}{100} = 2.80$$

R/Si =

$$\frac{(30 \times 1) + (30 \times 1) + (20 \times 1) + (20 \times 1) + (50 \times 2)}{60 + 40 + 50} =$$

1.47

It is hence seen that, to increase the functionality of the resin in the desired range (2.2 to 3, preferably 2.6 to 2.9), it is possible to add tetrachloro-1,2-dimethyldisilane, either pure or admixed with trimethyl-1,2,2-trichlorodisilane.

The proportion of silanols in the resin upon completion of hydrolysis ranges from approximately 2 to 8% by weight of OH relative to the total weight of the resin, typically from 3 to 6%. As is well known to the resin art, it is possible to accomplish what is referred to as the "advancement" of the resin, namely, a precrosslinking, by condensing a portion of the residual silanols with a view to increasing the viscosity of the product before it is used. This advancement can be accomplished, in particular, by heating the resin to from approximately 70° to 130° C., preferably about 100° C., with removal of the water formed, optionally in the presence of a metal catalyst (generally from 50 to 500 ppm calculated as metal equivalents, for example, a transition metal salt). It is also possible to render all, or a portion of the silanols in the resin functional by adding, during the hydrolysis, a $C_1$–$C_{12}$ aliphatic alcohol such as methyl, ethyl or butyl alcohol, or with alkyltrialkoxysilanes and/or alkoxysilanes in which the alkyl moiety is $C_1$–$C_{12}$, such as methyltrimethoxysilane, tetramethoxysilane and ethyltriethoxysilane.

The present invention also features a process for preparing the subject resins. According to this process, carried out either continuously or discontinuously, the mixture of organochlorosilanes and -disilanes, as defined above, is poured, under an inert atmosphere, into a reactor containing an excess of water of hydrolysis and the solvent which is immiscible or has very low miscibility with water, the reaction is maintained at a temperature below 80° C., the organic phase is decanted, the residual acidity is removed from the organic phase, for example, by washing it with water, and this organic phase is then filtered and dried. In one embodiment of the process of the invention, an appropriate amount of $C_1$–$C_{12}$ aliphatic alcohol, such as methyl or ethyl alcohol, is added during the hydrolysis in the reactor for the purpose of obtaining alkoxysiloxane units in the final product, by reaction of the alcohols with all or a portion of the silanols. The dry resin can be recovered by evaporation of the solvents under vacuum, or can be stored as such or in an advanced form, as described above, dissolved at a greater or lesser dilution in an organic solvent or alternatively in the form of aqueous dispersions, depending upon its subsequent applications. The resin obtained can, of course, be pre-cross-linked, as mentioned above.

As the organic solvent used during the cohydrolysis, it is possible to use toluene, chlorobenzene, white spirit, trichloroethylene, diethyl ether, diisopropyl ether or dibutyl ether.

Diisopropyl ether is the preferred solvent since this is the solvent which best enables avoiding the appearance of microgels, which in turn enables hydrolysis to be accomplished at a fairly high temperature, on the order of 50° C., and gives rise to higher proportions of silanols.

The hydrolysis water and the solvent are preferably present in a volume ratio in the region of 50:50. Moreover, the amount of water is calculated such as to provide a final concentration of HCl of from 2 to 10 moles per liter in the aqueous phase.

The resins containing disilane units can be used in any manner known for polysiloxane resins, and can be cross-linked by the conventional catalysts, which are generally metal salts, in general acylates of tin, zinc, iron or titanium, in an amount generally from 30 to 500 ppm calculated in metal equivalents relative to the weight of the dry resin.

They can be used in the form of molding powder, and in this case it is desirable to cross-link them at a temperature of from 250° to 350° C., preferably from 280° to 320° C. They can be used in the form of aqueous dispersions, optionally containing one of the above-mentioned catalysts, as waterproofing agents for textiles, or dissolved in an organic solvent as waterproofing agents for buildings, in particular for masonry and for concrete articles, and the organic solvent can be the same as that used for preparing the resin.

At equal average functionality, the use of disilanes in the resins according to the invention enables the proportion of alkyl radicals in the molecule to be increased. This factor is especially favorable for the waterproofing properties of the material.

The use of trifunctional and tetrafunctional disilane molecules makes it possible to avoid the formation of self-crosslinked microstructures based on T units. There is hence very little formation of microgels in the hydrolysate, and better filtration of the products, more efficient washing of the organic phase and easier decantation are thus observed. This is particularly noted in the synthesis of the methylated products of high functionality, which are difficult or even impossible to obtain by conventional cohydrolysis of $MeSiCl_3$ and $Me_2SiCl_2$.

The at least partial replacement of $MeSiCl_3$ by chlorodisilanes enables the prime cost of the products to be decreased, since disilanes are by-products of the direct synthesis of methylchlorosilanes.

$^{29}Si$ NMR analysis demonstrates that the disilane bond is preserved in the final resin during the cohydrolysis, despite the significant acidity of the medium.

The powdered resins containing disilane units require cross-linking at approximately 300° C. to attain their optimal properties. Analysis with the fiber torsional pendulum, as described below, shows, in comparison to the known resins, a decrease in the modulus of elasticity when cold and a decrease in the latter when hot, which reflects better cross-linking of the product in comparison to known resins. This is especially clear for the methylated resins, the mechanical behavior of which when hot (rigidity, stability) approaches that of the methyl/phenyl resins of the same average functionality, which makes it possible in some cases to substitute purely methylated products for some methyl/phenyl resins, to improve, inter alia, the non-stick properties without compromising thermal behavior.

As regards the waterproofing properties, the resins containing disilane units according to the invention improve three important points in comparison to the known resins. The incorporation of $\equiv Si-Si\equiv$ bonds enables purely methylated polymers of high functionality and high viscosity to be obtained while preserving a suitable proportion of silanols. To these three properties is added a fourth, which is a relatively high density of methyl groups despite the average functionality of the resins, which can be close to 3. The latter characteristic, like the other three, contributes to good surface waterproofing and to a good beading effect, as illustrated below, for the methylated resins containing disilane units.

In order to further illustrate the present invention and the advantages thereof, the following specific examples are given, it being understood that same are intended only as illustrative and in nowise limitative. Also, in the Tables to follow, the % of the chlorosilanes is given in molar %.

EXAMPLE 1

The starting mixture of chloroorganodisilanes and chloroorganosilanes had the following composition (in molar %):
(1) 40 molar % of a fraction of direct synthesis residue:
 (a) tetrachloro-1,2-dimethyldisilane: 55%
 (b) trimethyl-1,1,2-trichlorodisilane: 40%
 (c) tetramethyl-1,2-dichlorodisilane: 5%;
(2) 0% of $MeSiCl_3$; and
(3) 60% of $Me_2SiCl_2$.

This mixture, maintained under dry nitrogen, was poured, over approximately 1 hour, into a 1 l reactor equipped with a stirrer and reflux condenser, the reactor containing toluene and hydrolysis water (50:50 by volume), the amount of water being calculated as to provide a final HCl concentration on the order of 4 moles/l in the aqueous phase.

The reaction temperature, which was 20° C. at the beginning of reaction, was maintained below 30° C. by a water/ice bath. The reaction was allowed to continue for approximately 2 hours under stirring. The acidic water was decanted and the organic phase was washed to remove its residual acidity. The appearance of microgels was not detected in the hydrolysate in organic solution. The organic phase was filtered and dried over anhydrous $Na_2SO_4$. The resin was recovered by evaporation of the solvents under vacuum.

On the resin obtained, the proportion of silanols (percentage by weight of OH relative to the total weight of the resin) was determined by reacting the resin with an excess of $LiAlH_4$ and the corresponding release of hydrogen was measured by volumetric analysis. A content of 3.6% was found.

EXAMPLES 2 to 7

The procedure of Example 1 was repeated, except that the mixture of chlorosilanes to be hydrolyzed was modified, the characteristics thereof being reported in Table I which follows:

EXAMPLES 8 to 10

The procedure of Example 1 was repeated, except that phenyltrichlorosilane and pure tetrachloro-1,2-dimethyldisilane were used. The results are reported in the Table II which follows.

EXAMPLES 11 to 16

The procedure of Example 1 was repeated, except that phenyltrichlorosilane was also used. The characteristics thereof are reported in Table III which follows.

I—Analysis of mechanical properties

For this purpose, a fiber torsional pendulum was used.

Principle of the measurement:

A braid of glass fibers ($\approx$3,000 fibers) was impregnated with a solution of resin prepared according to Examples 1 to 16 above, with catalyst optionally added. After evaporation and drying of the composite under vacuum, the period and amplitude of the oscillations of the pendulum were measured as a function of temperature or time, according to the method described by B. Hartmann and G. F. Lee, *Journal of Applied Polymer Sciences*, 21, p. 1341 (1977).

The period P was related to the relative stiffness (RS) of the sample ($RS=(1/P^2)$), which was itself proportional to the modulus of elasticity $$G' = \frac{8\pi L I}{r^4} \times RS$$

(L, r and I being the length, radius and moment of inertia of the sample).

The amplitude of the oscillations provided the damping curve and the variation as a function of temperature of the loss modulus (Δ):

$$\Delta = \frac{1}{n} \log \frac{A_r}{A_{r+n}}$$

$A_r$=amplitude of the reference peak; $A_{r+n}$=amplitude of the peak after n cycles.

The analysis comprised three successive phases once the fiber had been impregnated with the resin containing a catalyst (300 ppm in metal equivalents) of Zn in the form of octoate.

First temperature rise from −160° to 250°-300° C. (subsequent cross-linking temperature) with Δt approximately 1.5° C./minute.

Cross-linking of the resin isothermally at 250° to 300° C. for 12 hours.

Slow cooling to −160° C. and second temperature rise to 400° C. with Δt ~1.5° C./minute.

The first run provided information about the glass transition temperature of the product (Tg).

$T_{\frac{1}{2}}$ denotes the temperature of the point of inflexion of the curve RS=f(T), and its divergence from Tg provided information about the heterogeneity of the product.

$T_C$ corresponded to the temperature at which cross-linking of the hydrolysate began.

The elasticity when hot ($\Delta RS_{300° C.}$ and $\Delta RS_{360° C.}$) after cross-linking (2nd run) reflected the effective cross-linking density of the network.

(A) Methylated resins

The values are reported in Tables IV and VII which follow.

From said reported results, the following data are extracted:

In general, Tg increased when the functionality of the product increased, notwithstanding the decrease in mass.

The use of tetrafunctional units in place of T units as cross-linking nodes caused an increase in Tg.

The divergence between Tg and $T_{\frac{1}{2}}$ remained on the same order of magnitude, 10° to 15° C., except for products with a large Tg.

The temperature at which cross-linking began (in the presence of 300 ppm of Zn in the form of zinc octoate) did not appear to be influenced by the nature or functionality of the resin. It was close to 130° C., as for the known resins.

When cross-linking was carried out at 300° C., the modulus of elasticity remained stable between 300° and 400° C.

Once the resin had been completely cross-linked, it was noted that the relative stiffness at 300° C. increased uniformly with the functionality of the products. In comparison with the other known methylated resins, the resins containing disilane units possessed a modulus of elasticity which was greater by 50 to 100% at identical average functionality of the monomers.

It can be concluded from the aforesaid that there had been better utilization of the potential nodes of the network. This is linked to the nature of the ≡Si—Si≡ tetrafunctional nodes, which have less tendency to self-cyclize, and also to the increased density of difunctional groups, which permits greater mobility of the chains during the condensation of the residual silanols.

The level of stiffness attained at high temperatures (T>200° C.) was high and can be compared with that of methyl/phenyl resins of the same average functionality.

The thermoplasticity of this family of products has been shown in Table VII by comparing the ratio of the stiffness of the products when cold and when hot.

In comparison with the known conventional methyl resins, the resins containing ≡Si—Si≡ units are more homogeneous in behavior as a function of temperature. This is due to a decrease in the stiffness when cold accompanied by an increase in the stiffness when hot.

(B) Methyl/phenyl resins (Tables V, VI and VIII)

The same characteristics were found as for the methylated resins.

Increase in Tg with functionality.

The temperatures at which cross-linking began remained in the region of 130° C.

Incomplete cross-linking was observed at 250° C., and this disappeared when the product was treated at 300° C.

The modulus of elasticity increased with the functionality of the product, and at equivalent functionality the proportion of phenyl slightly improved the stiffness of the composite.

In conclusion, the small divergence in thermomechanical properties between methyl/phenyl resins and methylated resins containing disilane units is to be emphasized. The moduli of elasticity when hot and the thermal stabilities (up to 400° C.) were similar, and were comparable to the properties of methyl/phenyl resins used for their superior thermomechanical properties.

II—Measurement of waterproofing properties

These were assessed by measuring the beading effect. To evaluate beading effect, a drop of water was deposited on a support coated with resin, and the drop angle or angle of contact between the drop of water and the support was measured. A 10% strength solution of resin in white spirit was prepared, in which an asbestos-cement test piece was immersed for 10 seconds. After the solvent was dried for 8 days under a hood, the angle of contact of a drop of water deposited on the test piece was measured. The measurement was taken at several points on the support to minimize the influence of the microporosity of the substrate, which plays an important role, above all for angles <90° C.

The drop angle measurements were performed on resins containing disilane units. The values obtained, which evidence completely satisfactory waterproofing properties, are reported in Table IX which follows.

COMPARATIVE EXAMPLES 17 to 21

Apart from Examples 20 and 21, the same procedure was followed as in Example 1, except that an organohalosilane mixture outside the scope of the invention was used. The results are reported in Table X which follows. From this Table, it is evident that all of the resins manifested the appearance of microgels during their manufacture.

TABLE I

| Examples | Functionality and Me/Si | | Chlorodisilanes % | % MeSiCl₃ | % Me₂SiCl₂ | Hydrolysis solvent | % of OH by weight | Microgels* |
|---|---|---|---|---|---|---|---|---|
| 1 | 2.62 | 1.56 | 40 | 0 | 60 | toluene | 3.6 | 0 |
| 2 | 2.72 | 1.51 | 49.5 | 0 | 50.5 | toluene | 3.1 | 0 |
| 2a** | 2.72 | 1.51 | 49.5 | 0 | 50.5 | toluene | 4.9 | 0 |
| 3 | 2.72 | 1.47 | 38.4 | 16.7 | 45.0 | diisopropyl ether | 5.2 | 0 |
| 4 | 2.77 | 1.51 | 50 | 0 | 50 | toluene | 3.0 | 0 |
| 5 | 2.77 | 1.51 | 50 | 0 | 50 | diisopropyl ether | 3.5 | 0 |
| 6 | 2.82 | 1.46 | 57.4 | 0 | 42.6 | diisopropyl ether | 3.7 | 0 |
| 7 | 2.87 | 1.45 | 60 | 0 | 40 | diisopropyl ether | 4.2 | 0 |

*observed upon completion of hydrolysis (filtration)
**hydrolysis at 50° C.

TABLE II

| Examples | Functionality | % Me₂Si₂Cl₄ | % φ SiCl₃ | % Me₂SiCl₂ | Hydrolysis solvent | % of OH (weight) | R/Si or φ/Si | Microgels |
|---|---|---|---|---|---|---|---|---|
| 8 | 2.62 | 25 | 12.5 | 62.5 | toluene | 2.1 | 1.5 / 0.10 | 0 |
| 9 | 2.70 | 10 | 50 | 40 | toluene | 3.3 | 1.36 / 0.455 | 0 |
| 10 | 2.82 | 18.2 | 45.5 | 36.4 | toluene | 3.7 | 1.31 / 0.385 | 0 |

TABLE III

| Examples | Functionality | % Chlorodisilanes | % φ SiCl₃ | % Me₂SiCl₂ | Hydrolysis solvent | % of OH | R/Si and φ/Si | Microgels |
|---|---|---|---|---|---|---|---|---|
| 11 | 2.64 | 25 | 25 | 50 | toluene | 4.8 | 1.4 / 0.20 | 0 |
| 12 | 2.73 | 20.1 | 39.6 | 40.2 | toluene | 5.7 | 1.33 / 0.33 | 0 |
| 13 | 2.82 | 51.4 | 7.3 | 41.3 | toluene | 3.2 | 1.27 / 0.048 | 0 |
| 14 | 2.82 | 32.3 | 32.3 | 35.5 | toluene | 5.1 | 1.27 / 0.244 | 0 |
| 15 | 2.82 | 31.3 | 36.5 | 32.3 | toluene | 3.6 | 1.25 / 0.278 | 0 |
| 16 | 2.82 | 42.2 | 46.8 | 29.0 | toluene | 5.7 | 1.23 / 0.377 | 0 |

TABLE IV

| Examples | Functionality | % OH | $T_g$(°C.) | $T_{\frac{1}{2}}$(°C.) | $T_C$(°C.) | Isotherm (°C.) | ΔRS × 10² 300° C. | ΔRS × 10² 360° C. |
|---|---|---|---|---|---|---|---|---|
| 1 | 2.62 | 3.6 | −37 | −20 | 140 | 300 | 2.0 | 2.0 |
|   |   |   | −41 | −27 | 150 | 250 | 0.95 | 1.8 |
| 2 | 2.72 | 3.1 | −40 | −29 | 145 | 250 | 1.15 | 1.95 |
| 3 | 2.72 | 5.2 | −26 | −17 | 130 | 300 | 2.8 | 2.8 |
| 4 | 2.77 | 3.0 | 0 | 14 | 130 | 300 | 2.6 | 2.55 |
|   |   |   | 0 | 12 | 130 | 250 | 1.25 | 2.40 |
| 5 | 3.5 | 3.5 | −22 | −12 | 130 | 300 | 2.45 | 2.30 |
|   |   |   | −27 | −14 | 220* | 250* | 1.30 | 2.25 |
| 6 | 2.82 | 3.7 | −2 | +10 | 145 | 300 | 2.90 | 2.80 |

*without crosslinking catalyst

TABLE V

| Examples | Functionality φ/Si | | % OH | $T_g$ (°C.) | $T_{\frac{1}{2}}$ (°C.) | $T_C$ (°C.) | Isotherm at (°C.) | ΔRS × 10² at 300° C. | ΔRS × 10² at 360° C. |
|---|---|---|---|---|---|---|---|---|---|
| 8 | 2.62 | 0.10 | 2.1 | −10 | 0 | 145 | 300 | 1.85 | 1.85 |
| 9 | 2.70 | 0.455 | 3.3 | 6 | 11 | 130 | 250 | 1.20 | 1.45 |
|   |   |   |   | 17 | 33 | 120 | 300 | 2.65 | 2.55 |
| 10 | 2.82 | 0.385 | 3.7 | 14 | 24 | 130 | 250 | 1.45 | 2.00 |
|   |   |   |   | 30 | 42 | 120 | 300 | 3.45 | 3.45 |
| 10a* | 2.60 | 0.600 | 4.7 | 12 | 20 | 140 | 250 | 0.70 | 0.65 |

TABLE V-continued

| Examples | Functionality φ/Si | | % OH | $T_g$ (°C.) | $T_{\frac{1}{2}}$ (°C.) | $T_C$ (°C.) | Isotherm at (°C.) | ΔRS × 10² at 300° C. | ΔRS × 10² at 360° C. |
|---|---|---|---|---|---|---|---|---|---|
| 10b* | 2.75 | 0.625 | ≈5 | 30 | 40 | 130 | 250 | 2.80 | 2.30 |

*10a - 10b: comparative examples on commercial methyl/phenyl resins without disilane units.

TABLE VI

| Examples | Functionality and φ/Si | | % OH | $T_g$ (°C.) | $T_{\frac{1}{2}}$ (°C.) | $T_C$ (°C.) | Isotherm at (°C.) | ΔRS × 10² at 300° C. | ΔRS × 10² at 360° C. |
|---|---|---|---|---|---|---|---|---|---|
| 11 | 2.64 | 0.20 | 4.8 | −12 | 3 | 125 | 250 | 0.85 | 1.30 |
| 12 | 2.73 | 0.33 | 5.7 | 14 | 23 | 130 | 250 | 1.05 | 1.45 |
| 13 | 2.82 | 0.278 | 3.2 | −3 | 12 | 150 | 250 | 1.30 | 2.30 |
|  |  |  |  | −13 | +5 | 140 | 300 | 2.85 | 2.80 |
| 14 | 2.82 | 0.244 | 5.1 | 10 | 24 | 120 | 300 | 3.20 | 3.05 |
|  |  |  |  | 24 | 35 | 130 | 250 | 1.45 | 2.20 |
| 15 | 2.82 | 0.278 | 3.6 | 12 | 38 | 130 | 250 | 1.60 | 2.15 |
| 16 | 2.82 | 0.377 | 5.7 | 25 | 40 | 125 | 250 | 2.0 | 2.3 |

TABLE VII

| Examples | Functionality | R/Si | A ΔRS × 10² at 0° C. | B ΔRS × 10² at 360° C. | Thermoplasticity B/A |
|---|---|---|---|---|---|
| 1 | 2.62 | 1.56 | 4.5 | 1.95 | 0.433 |
| 3 | 2.72 | 1.47 | 4.2 | 2.75 | 0.655 |
| 3a* | 2.72 | 1.28 | 5.1 | 1.7 | 0.300 |
| 4 | 2.77 | 1.33 | 4.3 | 2.5 | 0.581 |
| 5 | 2.77 | 1.51 | 5.35 | 2.3 | 0.430 |
| 6 | 2.82 | 1.46 | 4.45 | 2.8 | 0.629 |
| 7 | 2.87 | 1.45 | 4.05 | 2.8 | 0.691 |

*3a: Comparative example on a commercial methyl resin without a disilane unit.

TABLE VIII

| Example | Functionality | φ/Si | A ΔRS × 10² at 0° C. | B ΔRS × 10² at 360° C. | Thermoplasticity B/A |
|---|---|---|---|---|---|
| 8 | 2.62 | 0.1 | 4.0 | 1.8 | 0.45 |
| 9 | 2.7 | 0.45 | 8.3 | 2.55 | 0.31 |
| 10 | 2.8 | 0.38 | 8.5 | 3.45 | 0.41 |
| 10a | 2.6 | 0.6 | 9.45 | 0.75 | 0.04 |
| 10b | 2.75 | 0.625 | 18.4 | 2.3 | 0.125 |
| 13 | 2.82 | 0.07 | 5.6 | 2.75 | 0.49 |
| 14 | 2.82 | 0.20 | 7.5 | 3 | 0.40 |

TABLE IX

| Example | Functionality | Me/Si | % OH | Drop angle in ° |
|---|---|---|---|---|
| 1 | 2.62 | 1.56 | 3.6 | 82 ± 4 |
| 2 | 2.72 | 1.51 | 3.1 | 96 ± 3 |
| 2a | 2.72 | 1.51 | 4.9 | >120 |
| 3 | 2.72 | 1.47 | 5.2 | >120 |
| 3a* | 2.72 | 1.28 | 1 | 75 ± 2 |
| 4 | 2.77 | 1.48 | 3.0 | 101 ± 2 |
| 6 | 2.82 | 1.76 | 3.7 | >120 |
| 7 | 2.87 | 1.45 | 4.2 | >120 |

*Comparative example (see Table VII)

TABLE X

| Comparative Examples | Functionality and R/Si | | Me₂Si₂Cl₄ | MeSiCl₃ | Me₂SiCl₂ | Hydrolysis solvent | % of OH (weight) | Microgels* |
|---|---|---|---|---|---|---|---|---|
| 17 | 2.13 | 1.33 | 9.1 | 54.5 | 36.4 | toluene | 4.9 | few |
| 18 | 2.82 | 1.31 | 18.2 | 45.5 | 36.4 | toluene | 1.7 | many |
| 19 | 2.92 | 1.23 | 20.0 | 52.0 | 28.0 | toluene | 1.6 | many |
| 20** | 3.28 | 1.49 | 83.6 (Δ) | 0 | 16.4 | diethyl ether | 3.3 | many |
| 21*** | 3.53 | 1.24 | 100 (Δ) | 0 | 0 | diethyl ether | 2.5 | abundant |

*Observed upon completion of hydrolysis (filtration)
**According to Example 2 of French Patent No. 1,081,726
***According to Example 5 of French Patent No. 1 081,726
(Δ) Mixture of disilanes.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organosilicon resin containing recurring disilane units, which comprises the reaction product of a simultaneous cohydrolysis and condensation reaction in a heterogeneous solvent medium of an admixture of organochlorosilanes and organochlorodisilanes, said admixture comprising:
(i) from about 10 to 70 molar % of at least one diorganochlorosilane having the formula R₂SiCl₂, in which the radicals R, which may be identical or different, are each hydrogen, methyl or phenyl;
(ii) from about 30 to 70 molar % of at least one methylchlorodisilane which comprises at least about 30 molar % of tetrachloro-1,2-dimethyldisilane; and
(iii) from 0 to about 60 molar % of at least one organotrichlorosilane having the formula R'SiCl₃, in which R' is defined as is R above;

and said resin having an average functionality of from about 2.2 to 3.

2. The organosilicon resin as defined by claim 1, wherein R is methyl and R' is methyl or phenyl.

3. The organosilicon resin as defined by claim 1, having an average functionality of from 2.6 to 2.9.

4. The organosilicon resin as defined by claim 1, said admixture further comprising a free silanol reactive $C_1$–$C_{12}$ aliphatic alcohol or trialkoxysilane.

5. The organo silicon resin as defined by claim 1, in cross-linked state.

6. The organosilicon resin as defined by claim 1, in partially cross-linked state.

7. The organosilicon resin as defined by claim 1, wherein at least 80 molar % of said constituent (ii) comprises a mixture of tetrachloro-1,2-dimethyldisilane and trimethyl-1,1,2-trichlorodisilane.

8. The organosilicon resin as defined by claim 1 wherein all of constituent (ii) comprises tetrachloro-1,2-dimethyldisilane.

9. The organosilicon resin as defined by claim 1, said constituent (ii) comprising Rochow direct synthesis disilanes distilling at a temperature of from 152° to 154° C.

10. The organosilicon resin as defined by claim 1, comprising from about 2 to 8% by weight of silanol —OH functions based upon the total weight thereof.

11. A molding powder comprising particulate solids of the organosilicon resin as defined by claim 1.

12. A waterproofing agent comprising organic solution of the organosilicon resin as defined by claim 1.

13. A waterproofing agent comprising aqueous dispersion of the organosilicon resin as defined by claim 1.

14. The organosilicon resin as defined by claim 1, further comprising from 20 to 500 ppm of a metallic cross-linking catalyst.

15. A composition of matter comprising intimate admixture of:

(i) from about 10 to 70 molar % of at least one diorganochlorosilane having the formula $R_2SiCl_2$, in which the radicals R, which may be identical or different, are each hydrogen, methyl or phenyl;

(ii) from about 30 to 70 molar % of at least one methylchlorodisilane which comprises at least about 30 molar % of tetrachloro-1,2-dimethyldisilane; and (iii) from 0 to about 60 molar % of at least one organotrichlorosilane having the formula $R'SiCl_3$, in which R' is defined as is R above.

16. The composition of matter as defined by claim 15, further comprising a free silanol reactive $C_1$–$C_{12}$ aliphatic alcohol or trialkoxysilane.

17. A process for the preparation of an organosilicon resin, comprising cohydrolyzing and condensing, in heterogeneous solvent medium, the composition of matter as defined by claim 15.

18. The process as defined by claim 17, comprising cohydrolyzing and condensing said composition of matter in a heterogeneous solvent medium which comprises water and an organic solvent immiscible or slightly immiscible therewith, decanting the organic phase of reaction therefrom, removing residual acidity from said organic phase, and filtering and drying said de-acidified organic phase.

19. The process as defined by claim 18, further comprising adding a $C_1$–$C_{12}$ aliphatic alcohol or alkoxysilane to the reaction medium during the hydrolysis thereof.

20. A shaped article comprising the organosilicon resin as defined by claim 1.

21. The organosilicon resin as defined by claim 1, wherein the reaction product formed is essentially devoid of a microgel fraction.

22. The process as defined by claim 17, further comprising adding a $C_1$–$C_{12}$ aliphatic alcohol or alkoxysilane to the medium during the hydrolysis thereof.

* * * * *